United States Patent
Majors

[11] Patent Number: 5,388,338
[45] Date of Patent: Feb. 14, 1995

[54] INTERLOCKING SCREED LEVEL

[76] Inventor: Kevin R. Majors, 205 S. Story St., Boone, Iowa 50036

[21] Appl. No.: 136,915

[22] Filed: Oct. 18, 1993

[51] Int. Cl.$^6$ .......................... G01C 9/24; B65D 85/00
[52] U.S. Cl. ........................................ 33/376; 33/374; 206/372
[58] Field of Search .................... 33/374, 376, 379; 206/372, 349; 24/615, 616

[56] References Cited

U.S. PATENT DOCUMENTS

| | | | |
|---|---|---|---|
| 747,850 | 12/1903 | Bihlman | 33/376 |
| 1,132,318 | 3/1915 | Feder | 33/376 X |
| 3,200,464 | 8/1965 | Cousins | 24/616 X |
| 3,811,197 | 5/1974 | Moore et al. | 33/374 |
| 3,844,000 | 10/1974 | Hedu | 24/615 |
| 4,282,634 | 8/1981 | Krauss | 24/616 X |
| 4,285,556 | 8/1981 | Loeffel | 206/372 X |
| 4,515,268 | 5/1985 | Telly | 206/372 X |
| 5,119,936 | 6/1992 | Sevey | 206/349 |

*Primary Examiner*—Alvin Wirthlin
*Attorney, Agent, or Firm*—Hugh E. Smith

[57] ABSTRACT

An interlocking screed level and method comprising a rectangularly-shaped screed section having a top surface, a bottom surface, a front surface, a back surface, and a first and second end. A rectangular preform extension member of a lesser dimension than the exterior boundary of the screed section extends axially from the first end of the screed section. A rectangular joint recess extends axially from the exterior of the second end of the screed section and has a depth commensurate with the length of the extension member with a boundary of minimally less than the extension member for receiving extension members of adjoining screed sections. A first lock component is located at the first end of the screed section and a second lock component is located at the second end of the screed section. A bottom surface for planing concrete surfaces is provided. A level gage is provided in the top surface for ensuring levelness of the concrete surface.

2 Claims, 3 Drawing Sheets

INTERLOCKING SCREED LEVEL

BACKGROUND OF THE INVENTION

1. Field of the Invention

The present invention relates to interlocking screed levels and more particularly pertains to interlocking screed levels which may be used in leveling concrete surfaces contained within forms as used by the building trade and homeowners.

2. Description of the Prior Art

Tradesmen and homeowners typically have to perform concrete work at some point during their tenure on the job or as homeowners. One of the most important tasks they will have to perform in working with concrete is to devise a form into which uncured concrete will be placed. A form, essentially a restraining wall for uncured concrete, may be as simple as two two-by-fours laid side by side about three feet apart for a sidewalk, or as complex as a structure built of dozens of wooden sheets or rails for building a wall, floor, or foundation. Regardless of the complexity of the form used, the concrete usually must have a level surface when cured. To verify a level surface, a non-professional may use a flat board to plane the upper surface the uncured concrete surface of the cement to remove irregularities which stand above the form. While a homeowner may be able to improvise a screed level using a piece of wood, a building tradesman demands more professional results and usually chooses a dedicated screed level to plane and inspect the uncured concrete surface. Professional-quality screed levels are usually constructed of magnesium for durability against the general rigors of construction work and the particular corrosiveness of the lime found in cement. Further, typical screed levels are costly one-piece designs that are usually available only in standard lengths, such as 6–8 feet, 10 feet, 12 feet, 14 feet, and 16 feet. The one-piece design and standard-length configuration requires tradesmen to purchase and carry multiple screed levels to jobsites. Depending on how the screed is constructed, the chosen screed level may be too long or too short, resulting in a difficult and possibly inaccurate reading and uneven planing results. The present invention offers easy-to-carry interlocking screed level sections that may be combined to create screed levels of various lengths. Each section has a leveling bubble assembly visible from the top of the level. Accurate measurements and better planing results are easier to obtain using the present invention. The screed level sections are contained in a compact carrying case which keeps them organized and safe from damage. The present invention is a convenience and method that saves effort, time and money.

The use of screed levels is known in the prior art. More specifically, screed levels heretofore devised and utilized for the purpose of leveling concrete are known to consist basically of familiar, expected and obvious structural configurations, notwithstanding the myriad of designs encompassed by the crowded prior art which have been developed for the fulfillment of countless objectives and requirements.

The present invention is directed to improving devices for screed levels in a manner which is safe, secure, economical and aesthetically pleasing.

For example, U.S. Pat. No. 4,572,701 to Parsons et al, discloses a vertical stake for supporting screeds of varying sizes.

U.S. Pat. No. 4,012,159 to Berry describes a key-joint forming divider strip and upstanding screed for use with concrete slabs.

Another patent of interest is U.S. Pat. No. 4,026,658 to Neunendorf et al, describing a support mechanism for a tractor-mounted concrete leveling apparatus.

U.S. Pat. No. 3,891,338 to Smith discloses a pivoting screed connected to the undercarriage of a paving machine.

Finally, U.S. Pat. No. 4,012,024 to Courtois disclosing a key-joint forming divider strip and upstanding screed for use with concrete slabs.

The screed level mechanisms mentioned above, while sufficient for their intended usages, do not specifically address the requirements for a screed level to be used in jobsites not requiring interlocking concrete slabs, heavy machinery, or multiple screed configurations.

The present invention is best suited for use by building contractors and homeowners working by hand with wet concrete in small to medium sized endeavors.

In this respect, the screed level according to the present invention substantially departs from the conventional concepts and designs of the prior art, and in so doing provides an apparatus primarily developed for the purpose of leveling concrete at jobsites.

Therefore, it can be appreciated that there exists a continuing need for new and improved screed levels which can be developed for the purpose of leveling concrete at jobsites. In this regard, the present invention substantially fulfills this need.

As illustrated by the background art, efforts are continuously being made in an attempt to refine the concrete leveling process. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of screed levels now present in the prior art, the present invention provides an improved screed level developed for the purpose of leveling concrete at jobsites. As such, the general purpose of the present invention, which will be described subsequently in greater detail, is to provide a new and improved screed level apparatus which has many of the advantages of the screed level mentioned heretofore and many novel features that result in a screed level which is not anticipated, rendered obvious, suggested, or even implied by any of the prior art screed levels, either alone or in any combination thereof and which has none of the disadvantages of the prior art screed levels.

The invention is defined by the appended claims with the specific embodiment shown in the attached drawings. For the purpose of summarizing the invention, the invention may be incorporated into a new and improved interlocking screed level. The interlocking screed level comprises a rectangularly-shaped screed section having a top surface, a bottom surface, a front surface, a back surface, and a first and second end. A joint member comprising a rectangular preform extension member having a minimally lesser boundary dimension than the outside boundary of the screed section extends axially from the first end of the screed section. A joint recess comprising a rectangular entrance extends axially from the exterior of the second end of the screed section inwardly and has a depth commensurate with the length of the extension member with a boundary of minimally greater than the extension member for receiving extension members of adjoining screed sections. A first lock component is located at the first end of the screed section and a second lock component is located at the second end of the screed section. A bottom surface suitable for planing the wet concrete surface is provided. A level gage is provided in the top surface for ensuring levelness of the concrete surface.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved interlocking screed level comprising a rectangularly-shaped screed section having a top surface, a bottom surface, a front surface, a back surface, and a first and second end; a joint member comprising a rectangular preform extension member of a lesser boundary dimension than the outside boundary of the screed section extending axially from the first end of the screed section; a joint recess comprising a rectangular entrance extending axially from the exterior of the second end of the screed section and having a depth commensurate with the length of the extension member and a boundary dimension of minimally greater than the boundary dimension of the extension member for receiving extension members of adjoining screed sections; a lock means at the first end of the screed section; a lock means at the second end of the screed section; a bottom surface suitable for planing wet concrete; and a level means for ensuring levelness of the concrete surface.

It is another object of the present invention to provide a new and improved screed level which may be easily and efficiently manufactured and marketed.

It is a further object of the present invention to provide a new and improved screed level which is of a durable and reliable construction.

An even further object of the present invention is to provide a new and improved screed level which is susceptible of a low cost of manufacture with regard to both materials and labor, and which accordingly is then susceptible of low prices of sale to the consuming public, thereby making such screed levels economically available to the buying public.

Still yet another object of the present invention is to provide a new and improved screed level which provides in the apparatuses and methods of the prior art some of the advantages thereof, while simultaneously overcoming the disadvantages normally associated therewith.

Still another object of the present invention is to provide a new and improved screed level that is easy to transport.

Another object of the present invention is to provide a new and improved screed level that may be assembled by hand.

Yet another object of the present invention is to provide a new and improved screed level that may be assembled in a variety of lengths.

Even still another object of the present invention is to provide a new and improved screed level that provides screed assemblages with multiple leveling bubble gages for ensuring levelness of concrete.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
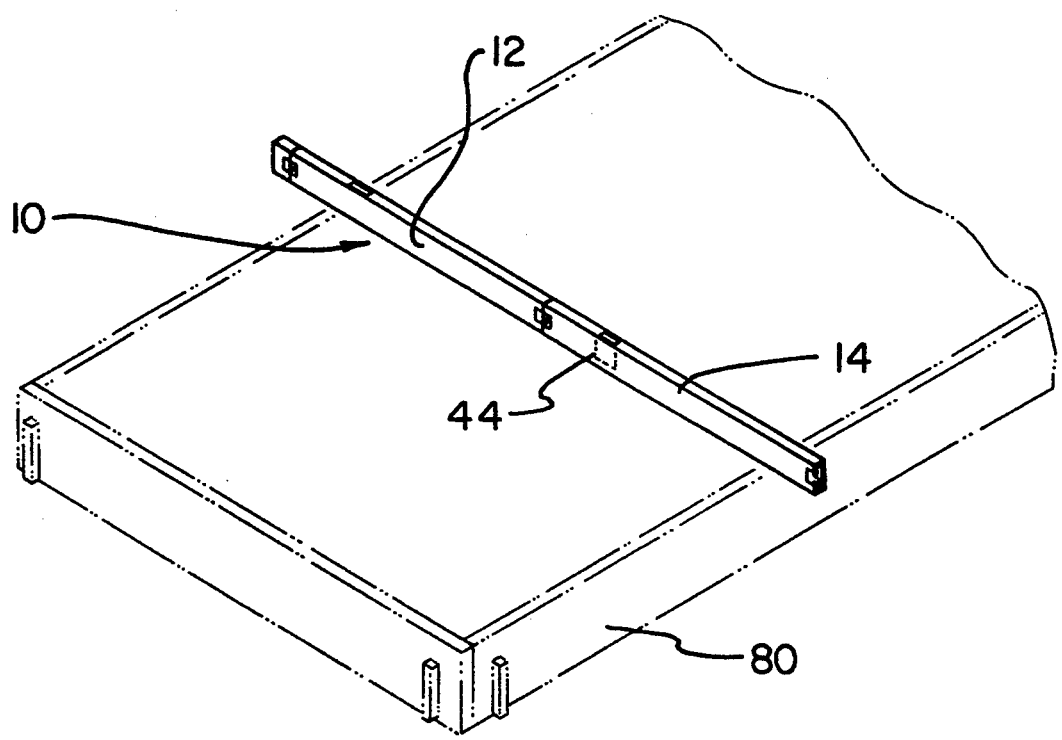
FIG. 1 is a perspective view of the present invention use.

With reference now to the drawings, and in particular to FIG. 1 thereof, a new and improved screed level embodying the principles and concepts of the present invention and generally designated by the reference numeral 10 will be described.

From an overview standpoint, the screed level 10 is adapted for use with the leveling uncured of concrete placed into forms 80 See FIG. 1.

Figure 3:
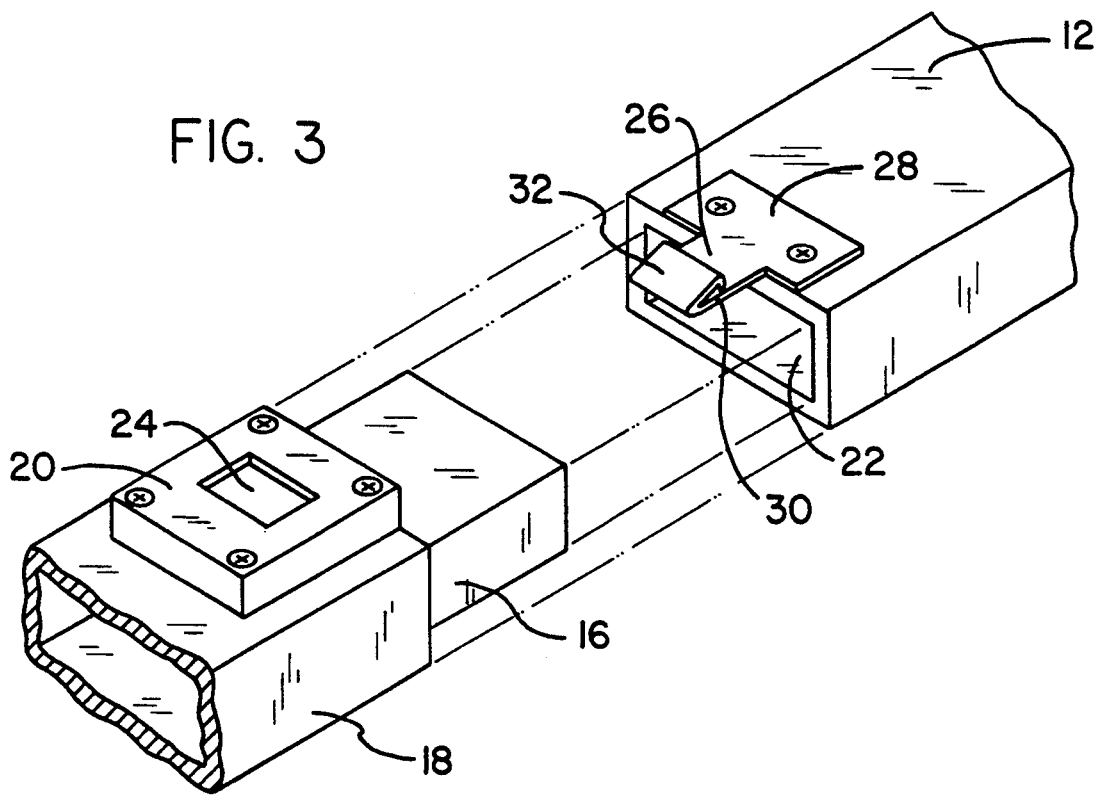
FIG. 3 is a perspective view of the extension member and a joint thereof.
Figure 4:
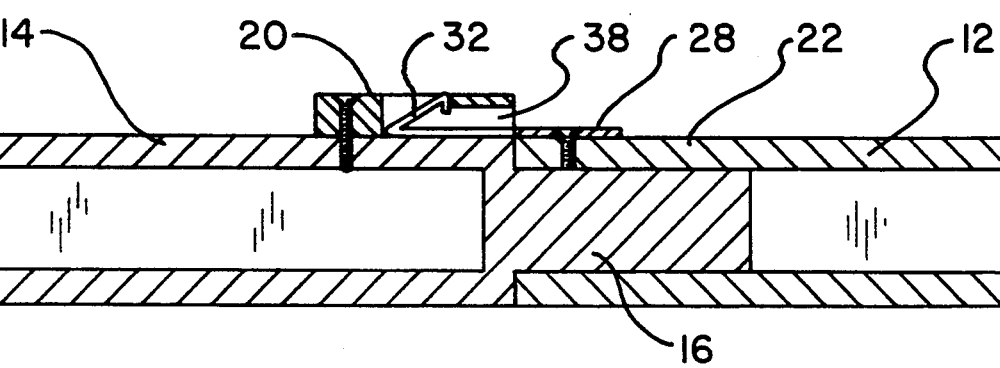
FIG. 4 is a cross sectional view showing the joint member, recess, and lock components.

More specifically, the screed level allows a multiplicity of screed sections 12 and 14 as shown in FIG. 1 to be interlocked by adjoining by hand and applying pressure in converging directions. As shown in FIG. 3, an extension member 16 is located at the first end of the screed section. The extension member extends axially from the first end of the screed section, and is a rectangular preform having a lesser boundary dimension than the outside boundary of the screed section body 18. A rectangular recess 22 of the second end extends axially and inwardly from the exterior of the second end of the screed section to a depth commensurate with the length of the extension member. The recess has an interior boundary dimension minimally greater than the exterior boundary dimension of the extension member 16 for receiving extension members of adjoining screed sections. A clip housing 20 is located at the first end of a screed section. The clip housing has an aperture 24 for receiving a flanged portion 26 of a clip latch 28. The clip latch is positioned medially at the first end of the screed section for insertion in the clip housing of adjoining screed sections. The clip latch is essentially a spring 30 with an inclined planar flange 32. When the clip latch is inserted into the clip housing, as shown in FIG. 4, the inclined planar flange slides through an opening 38 in side of the housing and into the aperture in the clip housing. When fully seated in the aperture, the spring force of the clip latch extends the flanged portion of the clip latch through the clip housing aperture.

Through an interference fit between joint extension member and joint recess, and the mechanism of the clip latch and clip housing, the screed sections are thus secured. Screed sections may be locked and unlocked by hand by depressing downwardly on the flange of the clip latch until the uppermost surface of the clip latch flange is beneath the lower surface of the clip housing aperture. No tools are required for this process.

Figure 2:
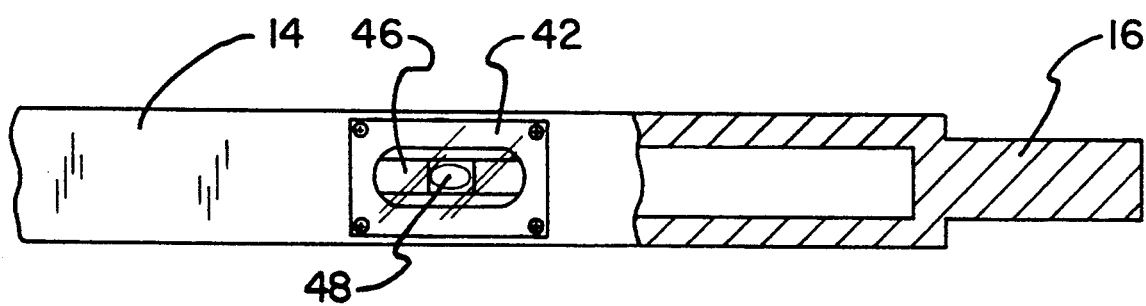
FIG. 2 is a top plan view of the screed showing a leveling bubble assembly.

A leveling bubble assembly 42 of FIG. 2 is located medially in a recess 44 at the top surface of each screed section. The leveling bubble assembly is a typical glass tube 46 partially filled with viscous fluid and having an air bubble 48 therewithin. The user ensures levelness of the concrete surface by viewing the leveling bubble from the top of the screed.

Figure 5A:
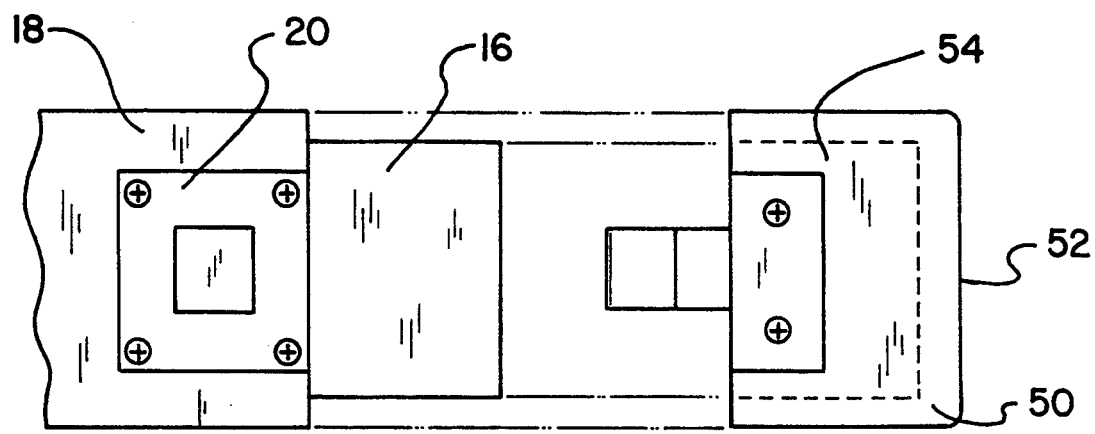
FIG. 5a is a partial elevational view showing an end cap and joint extension member.
Figure 5B:
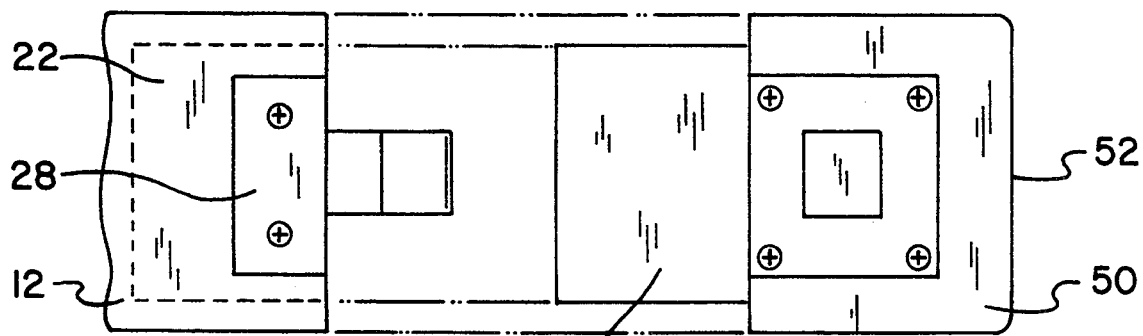
FIG. 5b is a partial elevational view showing a second end cap and joint extension member.

An end cap 50 as shown in FIG. 5 encapsulates the exposed ends of the first and last screed sections in any arrangement of interlocked screed sections for the purpose of protecting the screed section ends from damage. The end cap comprises a blind end 52 and either a rectangular opening 54 or an extension member 56 at the opposite end for use with screed sections terminated with either an opening or an extension member depending on manner of assembly.

Figure 6:
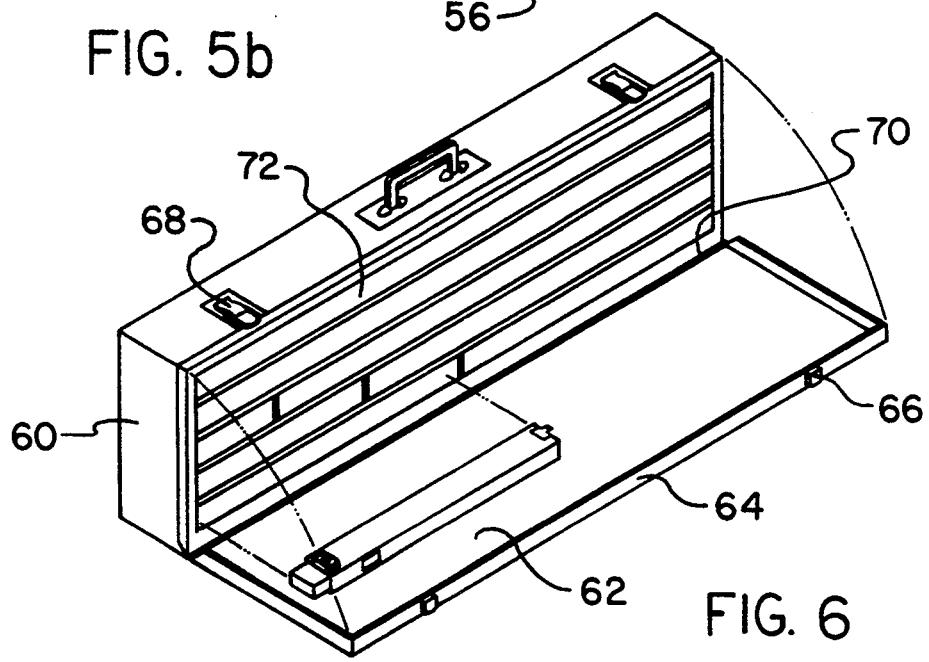
FIG. 6 is a perspective view showing a carrying case and shelves of the present invention.

A carrying case 60 as depicted in FIG. 6 is provided for transporting the screed sections, said carrying case having a top surface, a bottom surface, a front open surface for receiving screed sections to be stored and a rear surface. A forward opening lid 62 is positioned about the front surface of the carrying case. A lip 64 of the lid has at least one latch 66 which detachably couples with a snap 68 at the front edge of the top surface of the carrying case and has at least one hinge 70 operably coupled to the bottom front surface of the carrying case. Inside the case, shelves 72 receive screed sections and provide protection and organization to the screed sections. The screed sections are provided in a multiplicity of sizes not commonly available and heretofore available only through custom manufacture thereby allowing screed levels of unique lengths to be assembled.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed is:

1. An interlocking screed level comprising:
   a plurality of rectangularly-shaped screed sections, each having a top surface, a bottom surface parallel with the top surface, a front surface, a back surface parallel with the front surface, and a first end and a second end;
   a joint member integral with the first end, the joint member of the first end comprising a rectangular preform extension member of a lesser boundary dimension than the outside boundary of the screed section extending axially from the first end of the screed section;
   a joint recess integral with the second end, the joint recess of the second end comprising a rectangular entrance extending axially and inwardly from the exterior of the second end of the screed section to a depth commensurate with the length of the extension member and having an interior boundary dimension minimally greater than the exterior boundary dimension of the extension member for receiving extension members of adjoining screed sections;
   a first lock means for interlocking screed sections at the first end of each screed section, the first lock means comprising a clip housing positioned medially at the first end and on the front surface of each screed section, the first lock means comprising a clip housing with an aperture passing from the exterior of a top surface of the clip housing to the exterior of a bottom surface of the clip housing and therethrough and an opening at one side of the clip housing;
   a second lock means for interlocking screed sections at the second end of each screed section, the second lock means comprising a flanged clip latch positioned medially at the second end and on the front surface of each screed section for insertion in the clip housing opening of adjoining screed sections and thus securing the screed sections;
   the bottom surface of the screed sections when secured together being planar for planing concrete surfaces;
   a level means in the top surface for ensuring levelness of the concrete surface, the level means comprising a leveling bubble assembly having a glass tube partially filled with viscous fluid and located medially in a recess entering from the top surface of each screed section and
   at least one end cap for encapsulating at least one exposed end of at least one of said screed sections for the purpose of protecting said at least one exposed screed section end from damage.

2. The interlocking screed level of claim 1 and further including:
   a carrying case for transporting the screed sections, said carrying case having a top surface, a bottom surface, a front surface and a rear surface, the carrying case further comprising a forward opening lid positioned about the front surface of the carrying case, said lid having at least one latch detachably coupled with the lid at the front edge of the top surface of the carrying case and having at least one hinge operably coupled to the bottom font surface of the carrying case, the carrying case further including shelves for receiving screed sections and providing protection and organization to said screed sections.

* * * * *